March 15, 1955

M. GREEN 2,704,092

POWER HAND SAW AND WORK CONTROLLING
AND GUIDING MEANS THEREFOR

Filed March 1, 1954

4 Sheets-Sheet 1

INVENTOR.
Martin Green,
BY George D. Richards
Attorney

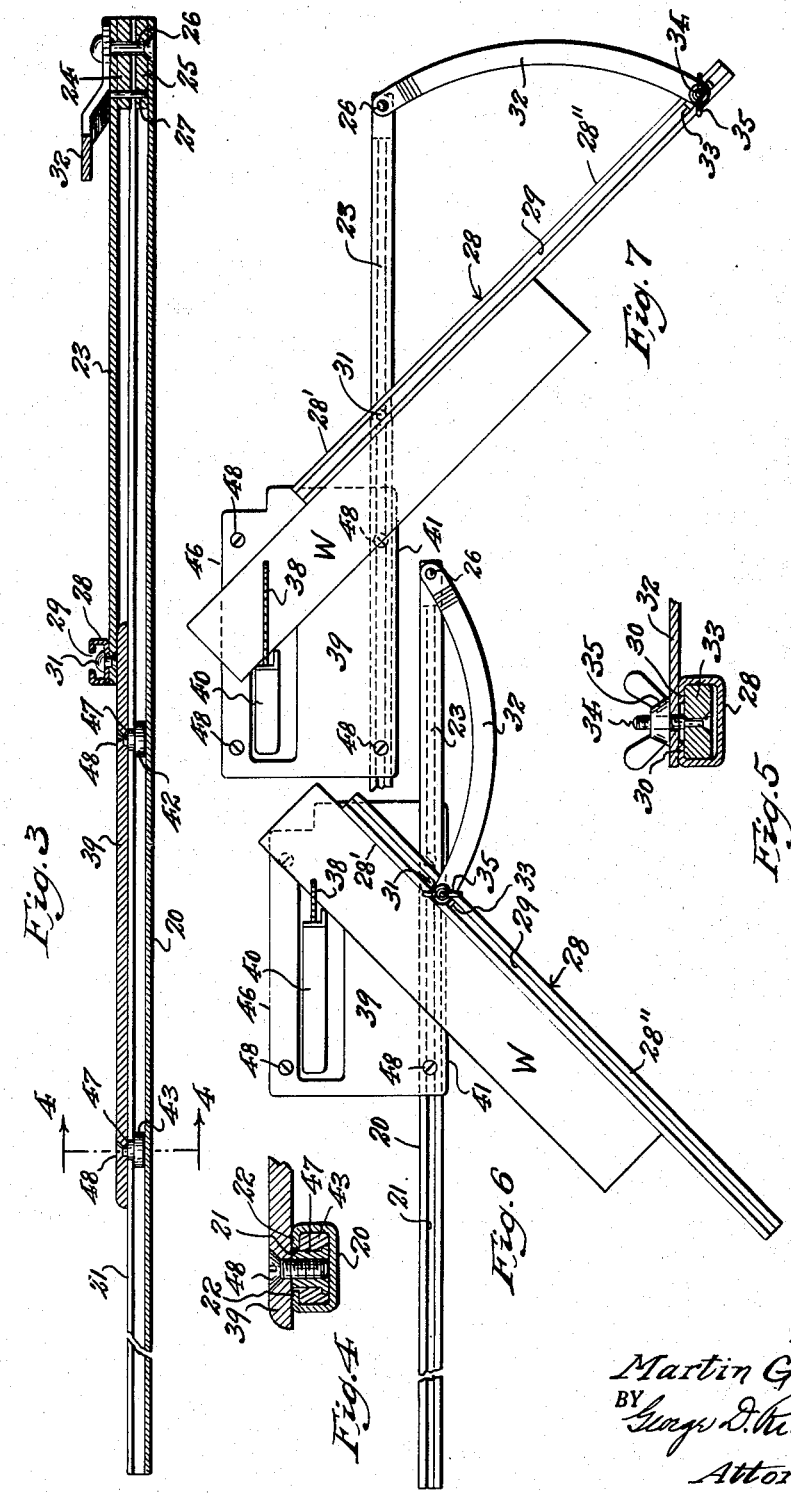

March 15, 1955

M. GREEN 2,704,092

POWER HAND SAW AND WORK CONTROLLING AND GUIDING MEANS THEREFOR

Filed March 1, 1954

4 Sheets-Sheet 3

INVENTOR.
Martin Green,
BY
George D. Richards
Attorney

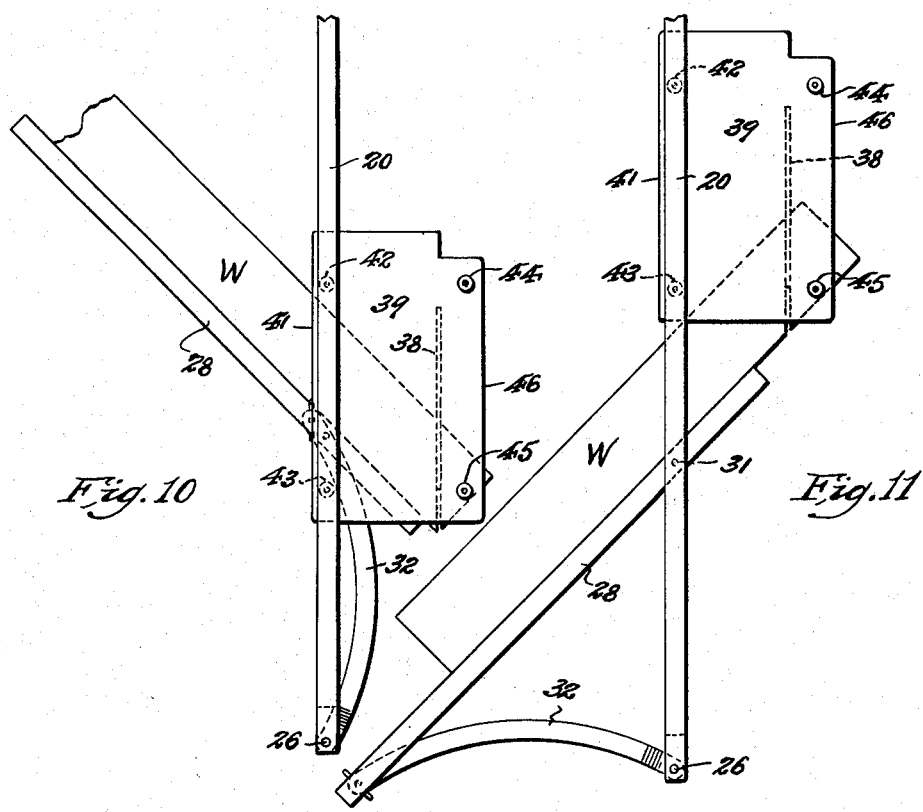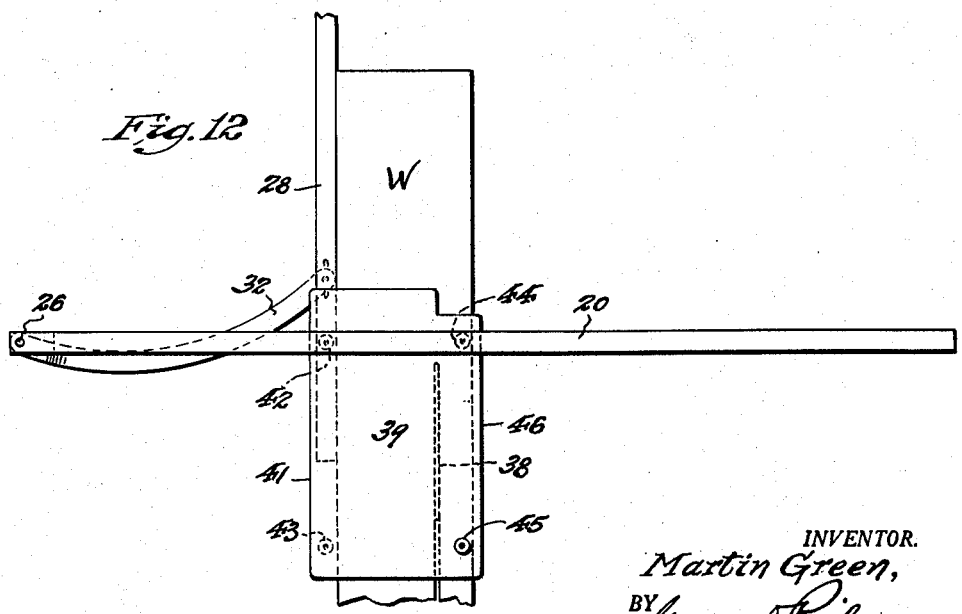

United States Patent Office 2,704,092
Patented Mar. 15, 1955

2,704,092

POWER HAND SAW AND WORK CONTROLLING AND GUIDING MEANS THEREFOR

Martin Green, Mahwah, N. J.

Application March 1, 1954, Serial No. 413,141

7 Claims. (Cl. 143—6)

This invention relates to power hand saws including work controlling and guiding means attachable thereto.

This invention has for an object to provide a power hand saw together with work controlling and guiding means adapted to be attached thereto in selective manner whereby the saw can be supported either in an inverted stationary position for use as a table saw, in which condition its shoe plate serves as a work supporting table over which the work is moved relative to the rotating saw blade, or the saw can be operated by hand in the usual manner so that its rotating saw blade is moved relative to the work.

The invention has for another object to provide novel work controlling and guiding means together with means to operatively attach the same to the shoe plate of a power hand saw in various selected positions for cooperation with the saw, accordingly as the latter is to be used as a stationary table saw or as a hand propelled movable saw.

The invention has for a further object to provide novel work controlling and guiding means for cooperation with a power hand saw, said means being easily and quickly adjustable to control and guide work to be operated upon by the saw according to the character of the saw cut desired to be effected; i. e., either for cross-cut sawing, angular or miter cross-cut sawing, or rip cut sawing.

Figure 1:
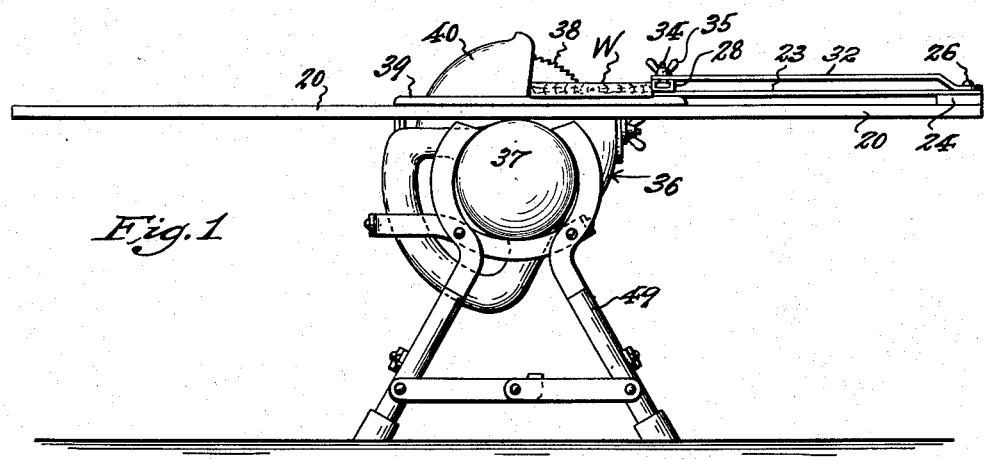
Figure 2:
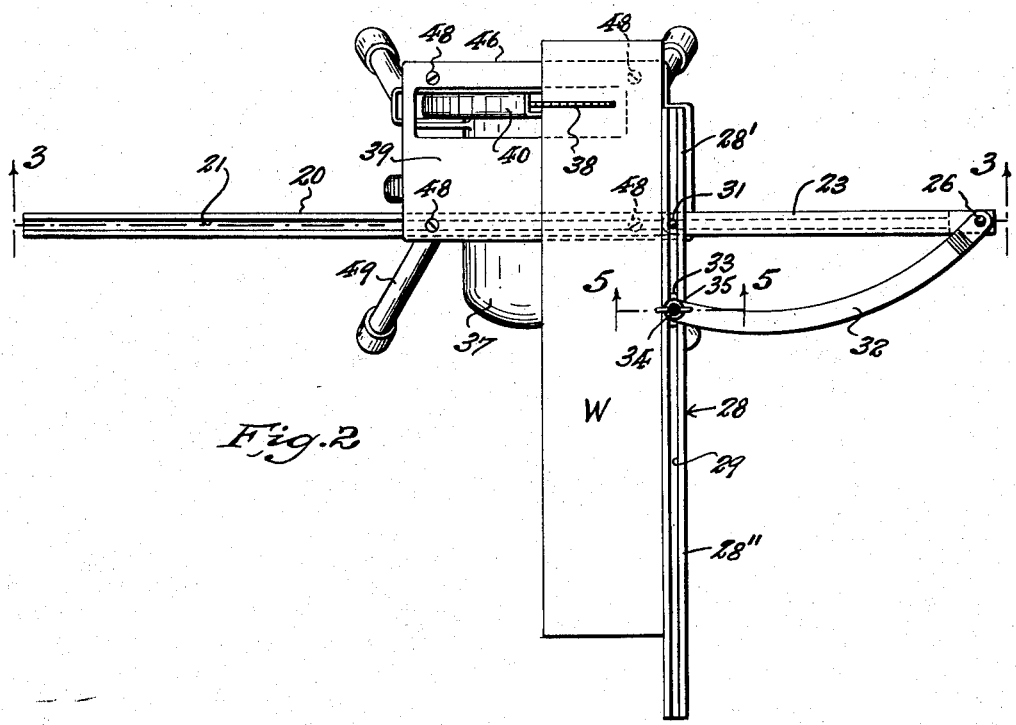
Figure 8:
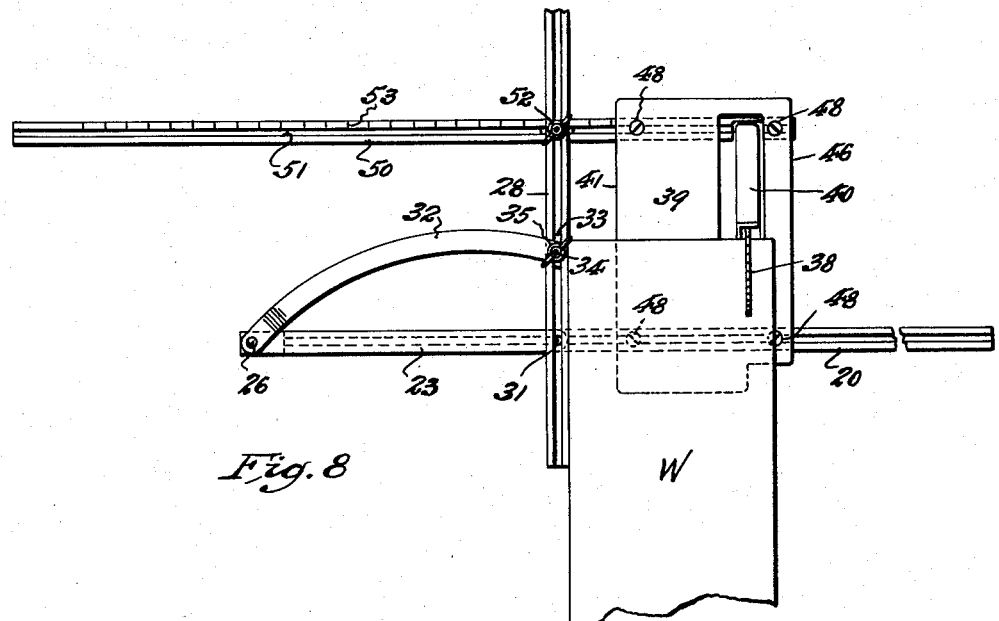

The above and other objects will be understood from a reading of the following detail description of this invention in connection with the accompanying drawings, in which:

Fig. 1 is a side elevational view of a power hand saw equipped with the work controlling and guiding means according to this invention, said saw being supported in an inverted stationary condition ready for use as a table saw, and the work controlling and guiding means being arranged to control and guide the work to effect a cross-cut sawing thereof; Fig. 2 is a top plan view of the same; Fig. 3 is a fragmentary longitudinal sectional view, taken on line 3—3 in Fig. 2, but drawn on an enlarged scale; Fig. 4 is a fragmentary transverse vertical section, taken on line 4—4 in Fig. 3, but drawn on a further enlarged scale; Fig. 5 is a fragmentary transverse vertical section, taken on line 5—5 in Fig. 2, but drawn on an enlarged scale; Fig. 6 is a schematic top plan view similar to that of Fig. 2, but showing the work controlling and guiding means adjusted and arranged to control and guide the work to effect an angular or miter cross-cut sawing thereof in one direction; Fig. 7 is a view similar to that of Fig. 6, with the work controlling and guiding means adjusted and arranged to control and guide the work to effect an angular or miter cross-cut sawing thereof in another or opposite direction; and Fig. 8 is a similar schematic top plan view, showing the work controlling and guiding means adjusted and arranged to control and guide the work to effect a rip cut sawing thereof.

Figure 9:
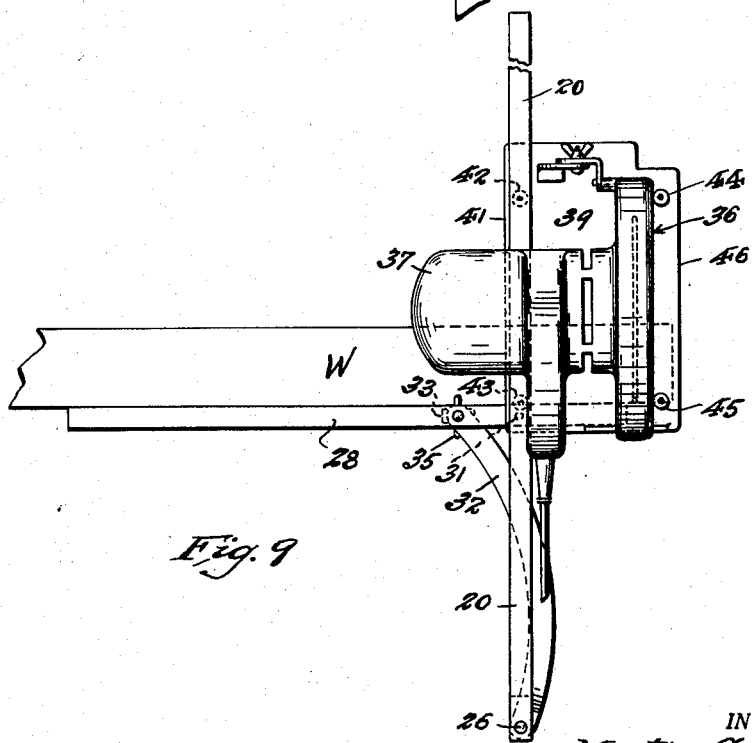

Fig. 9 is a top plan view of a power hand saw as normally disposed for hand propulsion relative to the work, and with the work controlling and guiding means attached thereto in adjusted and arranged position to control and guide the work for cross-cut sawing thereof; Fig. 10 is a schematic top plan view, similar to that of Fig. 9, but showing the work controlling and guiding means adjusted and arranged to control and guide the work to effect an angular or miter cross-cut sawing thereof in one direction; Fig. 11 is a view similar to that of Fig. 10, but showing the work controlling and guiding means adjusted and arranged to control and guide the work to effect an angular or miter cross-cut sawing thereof in another or opposite direction; and Fig. 12 is a similar schematic top plan view, showing the work controlling and guiding means adjusted and arranged to control and guide the work to effect a rip cut sawing thereof.

Similar characters of reference are employed in the above described views, to indicate corresponding parts.

Referring to the drawings, the work controlling and guiding means according to this invention comprises a hollow endwise open carrier bar 20 having a longitudinally extending medial slot 21 formed in one face thereof, whereby to provide said face with keeper lips 22 respectively bordering opposite sides of said slot (see Figs. 3 and 4). Rigidly affixed to the rear end of said carrier bar 20, so as to extend forwardly along said carrier bar in outwardly offset aligned relation to the slotted face of the latter, is a supporting arm 23 of suitable length. The adjoined ends of said carrier bar 20 and supporting arm 23 are spaced apart by an intermediate spacer block 24, and the carrier bar is provided with a filler block 25; these parts being connected together by a rivet element 26, with the supporting arm 23 held against rotative displacement relative to the carrier bar by a lock pin 27 passed therethrough and through said spacer and filler blocks (see Fig. 3). The reference character 28 indicates a hollow, endwise open guide bar which is also provided with a longitudinally extending medial slot 29 formed in its outer face, whereby to provide said face with keeper lips 30 respectively bordering opposite sides of said slot 29. Said guide bar is pivotally connected, by means of a rivet or like pivoting connection 31, at a point suitably inwardly spaced from an end thereof, with the inner free end portion of said supporting arm 23, so as to extend in angularly crossing relation to the carrier bar 20. The aforesaid pivotal connection of the guide bar 28 with the supporting arm 23 is so placed as to provide said guide bar with a short arm 28' extending in one direction, and a long arm 28" extending in the opposite direction. Pivotally connected with the adjoined ends of the carrier bar 20 and supporting arm 23, by the rivet element 26, is the rear end of a swingable adjusting link 32. The forward end of said adjusting link 32 is adapted to be releasably secured in selected adjusted attached relation to the guide bar 28; means for this purpose preferably comprising a clamp block 33 which is slidably movable within the interior of said guide bar, and which is provided with a screw threaded shank 34 to project outwardly through the slot 29 of the latter. A manipulatable wing nut 35 is threaded onto said shank 34, so that by turning home said wing nut on said shank, the clamp block 33 is drawn into tightly bound holding relation to the interior faces of the keeper lips 30 of the guide bar, thus fixing the latter in desired angularly disposed relation to the supporting arm 23 and carrier bar 20.

The reference character 36 indicates a power hand saw comprising the usual electric motor 37 which provides power for operating the rotary saw blade 38. Suitably supported in the customary manner in connection with the motor 37 is the shoe plate 39 of the saw, through which the rotary saw blade 38 projects beyond the normally bottom face thereof. Associated with the saw blade 38 is the usual pivoted saw guard 40, which is subject to displacement from its normal enclosing and guarding relation to the exposed portion of the saw blade by the work, as the saw cuts through the latter. Mounted on the normally top face of the shoe plate 39, respectively adjacent the respective ends of the latter and inwardly spaced from one or the inner longitudinal edge 41 thereof, are longitudinally aligned rollers 42 and 43, the same being arranged to rotate about axes perpendicular to the plane of the shoe plate. Similarly, also mounted on the normally top face of the shoe plate 39, respectively in transversely aligned relation to the respective rollers 42 and 43, are additional rollers 44 and 45, which are inwardly spaced from the opposite or outer longitudinal edge 46 of the shoe plate. An illustrative form of the roller structures is shown in Fig. 4, and comprises an internally screw-threaded journal sleeve 47 upon which the roller (e. g. the roller 43) is rotatably supported. The rollers are sized to fit within the hollow interior of the carrier bar 20, so as to slidably support the latter relative to the saw shoe plate 39. The journal sleeve 47 is affixed to the saw shoe plate 39 by a fastening screw 48, which is passed through said shoe plate from the normally bottom face thereof, to screw into the journal sleeve 47; the head of the fastening screw being flush with said normally bottom face of the shoe plate.

By inverting the power hand saw 36, and then suitably supporting the same in stationary position, said saw can be used as a table saw. This is shown in Figs. 1 and 2, wherein a supporting framework 49 supports the saw 36 in an inverted stationary position, in which position the normally bottom face of the saw shoe plate 39 is upwardly presented, and thus serves as a supporting table over which the work to be operated upon can be moved toward the rotating saw blade 38. Under these conditions, to mount the work controlling and guiding means for cooperation with the saw 36, and for manipulation in effecting cross-cut sawing of the work, the carrier bar 20 is engaged with the then downwardly directed, longitudinally aligned rollers 42 and 43, whereby said carrier bar is assembled with the stationary shoe plate 39 for longitudinal sliding movement relative to the latter. The wing nut 34 being loosened to release the clamp block 33 for sliding movement within and relative to the guide bar 28, the adjusting link 32 is freed for swinging adjustment relative to said guide bar, whereupon said guide bar is swung about its pivot 31 to a position wherein it extends across the carrier bar 20 at a right angle or perpendicular thereto, with its short arm 28' directed toward the saw blade 38. Such adjustment of the guide bar 28 having been made, the forward end of the adjusting link 32 is bound thereto by tightening home the wing nut 34, whereby to secure the guide bar in said adjusted position. Since the supporting arm 23 and the guide bar 28 supported thereby are upwardly offset relative to the carrier bar 20, these parts, when forwardly moved, will ride over the upwardly presented face of the saw shoe plate 39.

The work controlling and guiding means having been arranged as above described, the same is slid rearwardly to permit insertion of the work W between the saw blade 38 and the guide bar 28, with a lengthwise margin of said work abutting the latter, so as to be held perpendicular to the plane of the saw blade. The saw blade being put in motion, the operator now advances the work controlling and guiding means, as slidably supported by its carrier bar 20, so as to move the guide bar 28, and the work W positioned thereby, toward the saw blade, thus advancing the work to and across the rotating saw blade, whereby a cross-cut sawing of the work is effected (see Figs. 1 and 2).

If, in the use of the saw 36 as a stationary table saw, it is desired to effect an angular or miter cross-cut sawing of the work W, the guide bar 28 is accordingly adjusted to a left or right oblique angular relation to the carrier bar 20, for cross-cut sawing at a left to right angle relative to the longitude of the work W (see Fig. 6), or to a right to left oblique angular relation to the carrier bar 20, for cross-cut sawing at a right to left angle relative to the longitude of the work W (see Fig. 7). In either case, the angularly adjusted guide bar 28, when the work controlling and guiding means is advanced over the stationary inverted shoe plate 39 of the saw, will hold the work W at the selected angle relative to the plane of the saw, as said work is moved to and across the rotating saw blade, whereby the desired angular cross-cut sawing of the work is effected.

In all of the above described cross-cut sawing operations, it will be noted that the work controlling and guiding means, with the accompanying work, is moved relative to the stationary saw, so that said work is advanced across the saw blade thereby.

If, in the use of the saw 36 as a stationary table saw, it is desired to rip saw the work, the controlling and guiding means is assembled with and relative to the saw shoe plate 39 in a somewhat different manner, and so as to be held stationary with respect to the shoe plate, whereby to provide a guide along which the work W is moved subject to the sawing operation (see Fig. 8). In this case, the carrier bar 20 is engaged with the transversely aligned rollers 42 and 44, so as to be disposed transversely of the shoe plate 39 behind the saw blade 38. The guide bar 28 is thereupon disposed and secured by the adjusting link 32 in a position to extend across the carrier bar 20 perpendicular thereto, and parallel to the plane of the saw blade 38. After the work controlling and guiding means is thus arranged, the carrier bar 20 can be slid in or out across the shoe plate, whereby to predetermine the spacing of the guide bar 28 toward or from the saw blade 38, according to the width to which the work W is desired to be rip sawn. In the described disposition of the work controlling and guiding means for rip sawing operation, it is desirable to provide additional means for holding the guide bar 28 and carrier bar against accidental displacement from its established selected spaced work guiding relation to the saw blade 38. For this purpose an additional hollow, endwise open anchoring bar 50, having a longitudinally extending medial slot 51 formed in one face thereof, is provided. This anchoring bar 50 is engaged with the transversely aligned rollers 43 and 45, so as to be disposed transversely of the shoe plate 39 beyond the saw blade 38, and with its main body portion projecting outwardly from the work supporting side of the shoe plate 39, in parallel spaced relation to that portion of the carrier bar 20 which likewise so projects, and which carries the guide bar 28. This anchoring bar, when thus mounted, is releasably secured against longitudinal displacement, by so tightening down the screw 48 of the roller 45, that said screw also functions as a set screw to hold the anchoring bar against longitudinal movement. The anchoring bar extends beneath and across the forwardly extending end portion of the guide bar 28, and the latter is adapted to be releasably secured thereto by clamp block and cooperating wing nut means 52, similarly as the link bar 32 is secured to said guide bar. If desired, the anchoring bar 50 may be provided with a suitably graduated scale 53, with reference to which the guide bar 28 can be positioned according to a desired measured distance of spacing thereof relative to the saw blade 38. In the use of the saw 36 and the work controlling and guiding means, as thus assembled therewith to effect a rip sawing operation, a side edge of the work W is slidingly disposed against the guide bar 28, whereupon said work is advanced in contact with the guide bar and over the shoe plate 39 to and past the rotating saw blade 38, as indicated in Fig. 8.

As shown in Fig. 9, the work controlling and guiding means is equally well adapted for operative assembly and use with the power hand saw 36, when the latter is desired to be hand propelled in the ordinary way for performance of sawing operations by moving the same relative to the work. In such case, it being desired to operate the saw for cross-cut sawing, the carrier bar 20 is engaged with the now upwardly directed, longitudinally aligned rollers 42 and 43, so that the shoe plate 39 can slide on and along the same, when the saw is hand propelled. The guide bar 28 is then positioned to extend across the carrier bar at a right angle, or perpendicular thereto with its short arm 28' disposed beneath the shoe plate 39. The guide bar is held in such position by securing the adjusting link 32 thereto. Such relationship of the saw and the work controlling and guiding means having been established, the work W to be cross-cut is suitably supported, together with the work controlling and guiding means, on a work bench (not shown) or other suitable support, so as to be held stationary thereon by one hand of the operator, and with the work backed by the guide bar 28, and the end of said work to be sawn positioned in front of the saw blade. While the assembled work and controlling and guiding means is thus held, the saw 36 is advanced by the operator along the carrier bar 20, thereby causing the rotating saw blade 38 to traverse the work with cross-cut sawing effect. By positioning the guide bar 28 in selected oblique angular relation to the carrier bar 20, angular or miter cross-cut sawing of the work can be accomplished in similar manner. For example, Fig. 10 shows such disposition of the guide bar for effecting an angular or miter cross-cut in one direction, and Fig. 11 shows a disposition of the guide bar for effecting an angular or miter cross-cut in an opposite direction.

If hand propulsion of the saw 36 for rip sawing the work is desired, the carrier bar 20 is engaged with the transversely aligned rollers 42 and 44, so as to extend across the front end of the shoe plate 39, whereupon the guide bar 28 is positioned perpendicular to the carrier bar and parallel to the plane of the saw blade 38, being secured in such disposition by the adjusting link 32 (see Fig. 12). By sliding the carrier bar in or out, the guide bar 28 can be selectively spaced relative to the saw blade 38, according to the width to which the work W is desired to be rip sawn. In this case, the controlling and guiding means, being attached to the shoe plate 39 by the carrier bar, advances with the saw 36, as the latter is propelled along the work with rip sawing effect.

From the above it should now be apparent that the instant invention provides a unique, very convenient and easily applied work controlling and guiding means in combination with a power hand saw, whereby both crosscut and rip cut sawing operations can be carried out by either the usual hand propulsion of the saw, or by disposing the saw in a supported inverted stationary position for use in the manner of a table saw.

Having now described my invention, I claim:

1. In combination, a power hand saw having a rotatable saw blade and a shoe plate provided with longitudinally aligned and spaced apart rollers mounted on its normally top face adjacent to the inner longitudinal margin thereof, the axes of said rollers being perpendicular to the plane of said shoe plate, and work controlling and guiding means comprising a hollow endwise open, longitudinally slotted carrier bar adapted to engage said rollers so as to be supported thereby for slidable movement relative to said shoe plate, a guide bar, means to pivotally support said guide bar in connection with said carrier bar for superposed disposition relative to the plane of the normally bottom face of said shoe plate, and means to releasably secure said guide bar in selected adjusted positions determinative of angular crossing disposition thereof relative to the carrier bar.

2. The combination defined by claim 1, wherein the shoe plate is also provided with an additional roller transversely aligned with and spaced from the one of the first mentioned rollers which is positioned adjacent the normally leading end of said shoe plate, whereby the carrier bar can be optionally engaged with these rollers in adjusted transverse connection with the shoe plate so as to support the guide bar in parallel offset relation to the rotatable blade of the saw.

3. The combination defined by claim 2, wherein the shoe plate is further provided with another roller transversely aligned with and spaced from the one of the first mentioned rollers which is positioned adjacent to the normally trailing end of the shoe plate, a hollow endwise open, longitudinally slotted anchoring bar adapted to be engaged with said last mentioned rollers for transverse extension from the shoe plate, and means to releasably couple the guide bar to said anchoring bar when the former is supported by the carrier bar in parallel offset relation to the rotatable blade of the saw.

4. In combination, a power hand saw having a rotatable saw blade and a shoe plate provided with longitudinally aligned and spaced apart rollers mounted on its normally top face adjacent to the inner longitudinal margin thereof, the axes of said rollers being perpendicular to the plane of said shoe plate, and work controlling and guiding means comprising a hollow endwise open, longitudinally slotted carrier bar adapted to engage said rollers so as to be supported thereby for slidable movement relative to said shoe plate, a supporting arm affixed to an end of said carrier bar to extend inwardly along the same in spaced apart relation thereto, whereby to be movable over the normally bottom face of said shoe plate, a guide bar pivotally connected with the inner free end of said supporting arm, an adjusting link pivotally connected with the adjoined outer ends of said supporting arm and carrier bar, and means to releasably secure the free end of said adjusting link to the guide arm in selected positions determinative of angular crossing disposition of said guide bar relative to said carrier bar.

5. The combination defined by claim 4, wherein the shoe plate is also provided with an additional roller transversely aligned with and spaced from the one of the first mentioned rollers which is positioned adjacent the normally leading end of said shoe plate, whereby the carrier bar can be optionally engaged with these rollers in adjusted transverse connection with the shoe plate so as to support the guide bar in parallel offset relation to the rotatable blade of the saw.

6. The combination defined by claim 5, wherein the shoe plate is further provided with another roller transversely aligned with and spaced from the one of the first mentioned rollers which is positioned adjacent to the normally trailing end of the shoe plate, a hollow endwise open, longitudinally slotted anchoring bar adapted to be engaged with said last mentioned rollers for transverse extension from the shoe plate, and means to releasably couple the guide bar to said anchoring bar when the former is supported by the carrier bar in parallel offset relation to the rotatable blade of the saw.

7. In combination, a power hand saw having a rotatable saw blade and a shoe plate provided with longitudinally aligned and spaced apart rollers mounted on its normally top face adjacent to the inner longitudinal margin thereof, the axes of said rollers being perpendicular to the plane of the shoe plate, and work controlling and guiding means comprising a hollow endwise open, longitudinally slotted carrier bar adapted to engage said rollers so as to be supported thereby for slidable movement relative to said shoe plate, a supporting arm affixed to an end of said carrier bar to extend inwardly along the same in spaced apart relation thereto, whereby to be movable over the normally bottom face of said shoe plate, and endwise open, longitudinally slotted guide bar pivotally connected with the inner free end of said supporting arm, an adjusting link pivotally connected with the adjoined outer ends of said supporting arm and carrier bar, and means to adjustably secure the free end of said adjusting link to the guide bar in selected positions determinative of angular crossing disposition of said guide bar relative to said carrier bar, said latter means comprising a clamp block slidable in the guide bar and having a screw-threaded shank projecting through the guide bar slot and the free end of the adjusting link, and a wing nut threaded onto said shank externally of said adjusting link.

References Cited in the file of this patent

UNITED STATES PATENTS

| | | |
|---|---|---|
| 1,179,140 | Repp | Apr. 11, 1916 |
| 2,166,703 | Boice | July 18, 1939 |
| 2,401,972 | Sellmeyer | June 11, 1946 |
| 2,458,846 | Gilmore | Jan. 11, 1949 |
| 2,651,333 | Spinney | Sept. 8, 1953 |